Patented Apr. 26, 1932

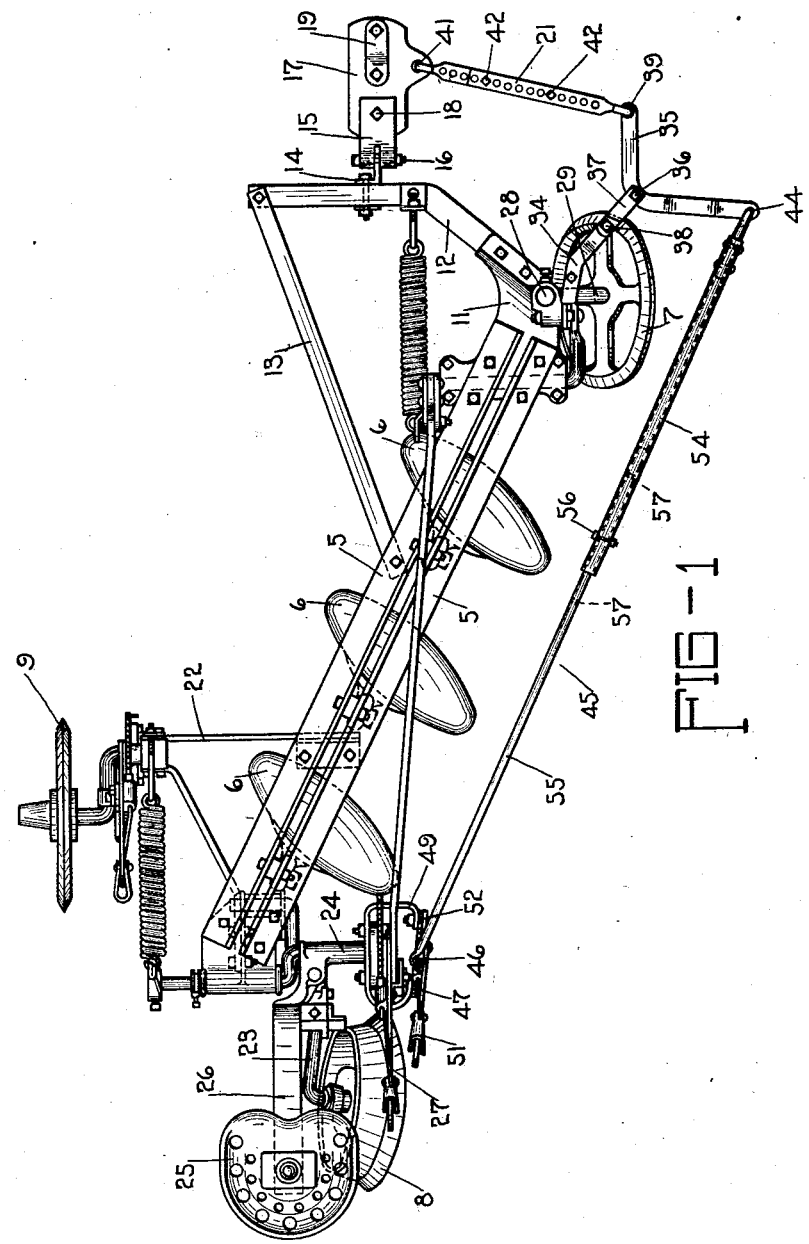

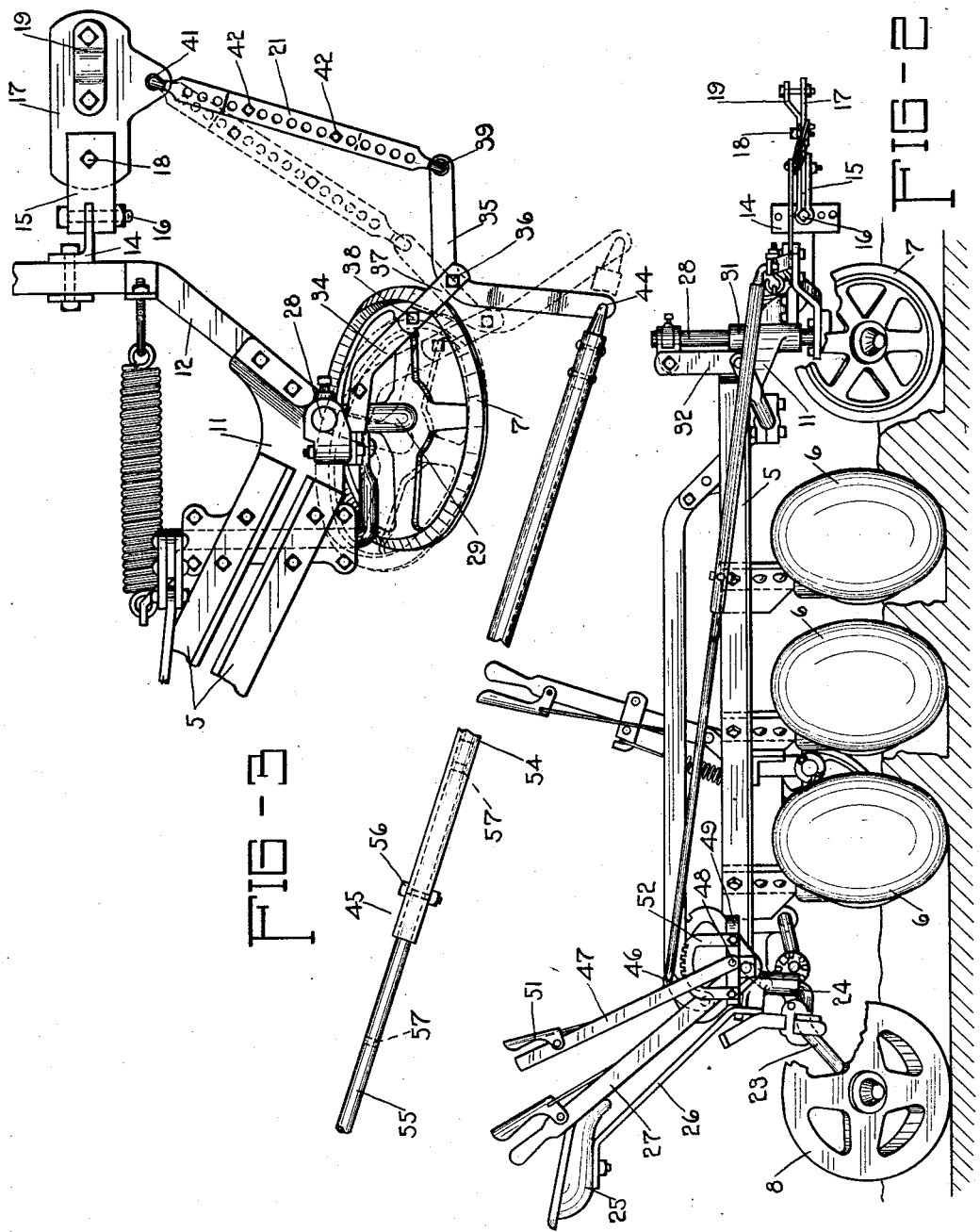

1,855,733

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

PLOW

Application filed August 8, 1928. Serial No. 298,198.

The present invention relates to wheeled plows, particularly of the disk type, and aims primarily to provide improved means for angling or controlling the front furrow wheel thereof.

In the plowing operation, this front furrow wheel runs in the bottom of the furrow opened by the last disk on the preceding round, and serves to guide the plow for obtaining the proper width of furrow cut. Accurate tracking of this wheel in the bottom of the furrow is frequently disturbed by varying soil conditions, and by the inclination of the implement when plowing along the side of a hill. For example, when plowing in soft ground, the plow frequently has a tendency to draw in toward the land—away from the furrow side—and under such conditions, the front furrow wheel will cut into the furrow wall or try to climb the same.

On the other hand, when plowing in hard ground, the implement will frequently have a tendency to work outwardly, away from the land—toward the furrow side—and, under such conditions, the front furrow wheel will tend to track out of the bottom of the furrow. Obviously, when plowing along the side of a hill, the inclination and weight of the plow frequently tend to deflect the same out of its desired course of travel. Varying conditions, such as I have described, are frequently encountered in the same field, and in most instances, it is impossible to tell definitely how the plow is going to travel until it is in operation. For these reasons, it is practically impossible to give the front furrow wheel a fixed angular adjustment relatively to the line of draft which will properly guide the plow under all conditions.

The fundamental object of the invention is to provide improved means by which the front furrow wheel can be angled relatively to the plow and to the line of draft while the plow is in operation, so as to maintain the proper width of furrow cut under the varying soil conditions and slope of ground referred to above. More specifically, it is one of the objects of the invention to provide means of this description which can be actuated by the operator from his position on the plow. This adjusting or guiding means enables the front furrow wheel to have its steering angle adjusted relative to the draft device, through which the plow is drawn, while still leaving the furrow wheel subject to the steering action of the draft device, so that the wheel will be properly turned when the plow is turned at the end of the field.

Referring to the accompanying drawings wherein I have illustrated a preferred embodiment of my invention:

Figure 1 is a plan view of a disk plow to which the invention has been applied;

Figure 2 is a side elevational view of the same; and

Figure 3 is a fragmentary plan view of the front furrow wheel and adjusting means, illustrating one of the adjusted positions of the wheel in dotted lines.

The invention is applicable to practically all types of wheeled plows which are subject to the above conditions, the plow illustrated being of conventional construction, comprising a frame 5 carrying a plurality of plow disks 6 and supported on front and rear plow wheels 7 and 8 and a land wheel 9. The front furrow wheel has dirigible mounting in a front bracket casting 11, which is secured to the front ends of the frame bars 5, and extending laterally from this casting is a draft bar 12, the outer end of which has braced connection with one of the beam bars 5 through a bracing strut 13. An angle plate 14 is secured to the front side of the draft bar 12 and extends into the slotted rear end of a clevis 15, which carries a pivot bolt 16, adapted to engage selectively in any one of a series of vertically spaced holes in the angle plate 14. A draft device 17 in the form of a plate extends between the top and bottom sides of the clevis 15 and has pivotal mounting therein on a vertical pivot bolt 18, extending down through the clevis and the plate.

Any suitable coupling means 19 may be connected with the draft device 17, for effecting a draft hitch therewith. The horizontal swinging movement of the draft device 17 around the vertical pivot axis 18, incident to turning movement of the plow at the end of the field, is transmitted to the front furrow wheel 7 through a steering link 21, as will be hereinafter described. The land wheel 9 is mounted on a lateral frame extension 22 and may be arranged for either a power or manual lift. Any suitable lifting mechanism may be interposed between the rear end of the frame 5 and the rear furrow wheel 8. In the construction shown, I have illustrated the form of manually operated lifting mechanism constituting the subject matter of my copending application, Serial No. 298,197, filed Aug. 8, 1928, wherein the furrow wheel is mounted on a rearwardly extending axle 23, supported on a wheel carrying member 24 which has linked connection with the frame for a combined translatory and oscillatory motion relatively to the frame. The operator's seat 25 is mounted on a bar 26 extending rearwardly from the wheel carrying member 24. Said lift mechanism is actuated through a lifting lever 27 disposed in proximity to the operator's position.

The front furrow wheel 7 has any desired mounting on the frame, by which it may be steered. In the construction shown, the wheel is journalled on the downwardly and outwardly inclined spindle end 29 of a vertical wheel standard 28. The front bracket casting 11 is formed with a long vertical guide boss 31, which is mounted to slide up and down along the wheel standard, and in which the wheel standard can rotate to permit the steering movement of the wheel.

Any suitable lifting mechanism, generally indicated at 32, connects the front portion of the frame with the upper end of the wheel standard for effecting lifting and lowering motion of the front end of the frame along the standard.

The wheel is angled through a steering arm 34, which is secured to the wheel standard, preferably adjacent to the outwardly extending spindle end 29 thereof, and which projects forwardly and outwardly above the wheel. In conventional practice, this arm is usually connected directly with the steering link 21 so that the furrow wheel is maintained in a definite angular relation to the hitch device 17 and is steered directly thereby. In the present invention, I interpose a lever 35 between the arm 34 and link 21, through which lever the angular relation between the furrow wheel 7 and hitch device 17 may be adjusted by the operator from his position on the plow, while still leaving the furrow wheel subject to the steering action of the hitch device. Said lever is of bell crank formation and has its intermediate portion pivotally mounted on the outer end of the steering arm 34 on a vertical pivot bolt 36. To reenforce said pivotal mounting, a strap or bar 37 is bolted to the arm 34 at 38 and extends over one side of the lever 35 to form a yoke or clevis in which the lever is pivoted. The forwardly extending arm of the lever is pivotally connected at 39 to the outer end of the steering link 21, the inner end thereof being pivotally connected at 41 to the draft device 17. Said link is preferably adjustable in length, comprising two relatively extensible sections, having holes adapted to align for receiving bolts 42 for securing the link in any length of adjustment.

The adjustments afforded by said steering link are intended to be more or less permanent, the temporary adjustments to compensate for different soil conditions, etc., being obtained through swinging motion of the lever 35.

The laterally extending arm of such lever is pivotally connected at 44 to an operating rod extending diagonally rearwardly to the operator's position at the rear of the plow. Here this rod is pivotally connected at 46 to an actuating lever 47, which is pivotally mounted at 48 on a bracket 49. The lever is provided with the usual latch mechanism 51 adapted to lock the lever in any adjusted position by engagement with a latching sector 52, which is also mounted on the bracket 49. Such bracket may be secured in stationary relation on the frame, or it may be mounted on the outer end of the wheel carrying member 24, adjacent to the lifting lever 27, as shown in Figure 1. In these plows, it is quite common to provide for converting a three-disk plow into a two-disk implement and, in making such change from one number of disks to the other, the mounting of the rear furrow wheel is usually shifted bodily relatively to the beam bars 5. To accommodate such shifting, the operating rod 45 is made adjustable in length, comprising a tubular section 54 and a bar section 55, which telescopes therein. A bolt 56 passes through the end portion of the tubular element 54 and is adapted to engage selectively in any one of a series of holes 57 in the bar section 55.

The operation of the device is best illustrated in Figure 3. If, because of soil conditions or the slope of the land, the plow has a tendency to work in toward the land side, cutting an objectionably wide furrow, the actuating lever 47 is moved forwardly, swinging the bell crank lever 35 in a counterclockwise direction and angling the furrow wheel 7 outwardly to guide the plow more accurately along the desired furrow line.

As illustrated in dotted lines in Figure 3, such motion of the bell crank lever swings the forwardly extending arm thereof more nearly into alignment with the steering link 21, thereby lengthening the operative connection between the draft device and the steering arm 34 and swinging the furrow wheel outwardly. At this time, the draft pull exerted through the draft device 17 maintains the latter in substantially fixed relation to the frame, so that this draft device functions as a substantially fixed member against which the forces in the steering link 21 react in angling the wheel. If it is desired to give the wheel an inward direction of lead to correct for other soil conditions tending to deflect the plow toward the furrow side, the actuating lever 47 is pulled rearwardly to swing the bell crank lever 35 in a clockwise direction (Figure 3) to thereby, in effect, shorten the length of the operative connection between the draft device 17 and the wheel and swing the wheel inwardly relatively to the plow. When the plow is turned at the end of the field, the right or left swing of the hitch device 17 around the pivot pin 18 is transmitted to the furrow wheel through the link 21 and lever 35, irrespective of any inward or outward lead which may have been given said wheel through the adjusting mechanism. Hence, the adjustments established through this mechanism do not interfere with the steering of the wheel in the turning of the plow. In said steering movement, the operating rod 45 swings around its rear pivotal connection 46 as a center.

It will be seen that the present adjusting mechanism has adaptability as an attachment which can be quickly and easily mounted on different standard designs of plows by merely pivoting the bell crank lever 35 on the steering arm 34 and by suitably mounting the actuating lever 47 adjacent to the operator's position, neither of which operations necessitate any alteration of the design of the implement.

Having thus described my invention, what I claim as new and desire to secure by Letters Patent is:

1. In a wheeled plow, in combination, a pivoted draft device, a front furrow wheel, means establishing an operative connection between said draft device and said wheel whereby said wheel is steered, an operator's seat, means carrying said seat and capable of bodily adjustment, and means for varying the effective length of the operative connection between said draft device and wheel, including a lever mounted on said carrying means.

2. In a wheeled plow, in combination, a pivoted draft device, a front furrow wheel, connecting means between said draft device and said wheel whereby the latter is steered, an operator's seat, means securing said seat to the plow and capable of adjustment relatively thereto, and means for varying the effective length of the operative connection between said draft device and wheel, including a lever mounted on said securing means and an operating rod extending from said lever to said connecting means.

3. In a wheeled plow, a frame, a pivoted draft hitch, a dirigible front furrow wheel adapted to be steered thereby, a rear furrow wheel carrying member capable of bodily movement relative to said frame, operating connections between said draft hitch and said front wheel including a pivoted lever, means mounted on said wheel carrying member for adjusting the position of said pivoted lever, and connecting means between said last mentioned means and said pivoted lever.

4. In a wheeled plow having a frame, a pivoted draft device, a front furrow wheel pivoted to said frame and adapted to be steered by said draft device, a rear furrow wheel, a wheel carrying member for said rear wheel and adjustable relative to said frame, and an operator's seat carried by said wheel carrying member, the combination of means for adjusting the position of the front wheel relative to said draft device and comprising lever means connected with said front wheel and said draft device, and means mounted on said wheel carrying member adjacent the operator's seat and adapted for adjusting said lever means, whereby the angular relation between said front wheel and said draft device can be varied.

5. In a wheeled disk plow having a frame and an operator's seat adjacent the rear end thereof, the combination of a frame, front and rear furrow wheels and a land wheel supporting said frame, a draft device pivotally connected to the forward portion of said frame for horizontal swinging movement, a wheel standard on which said front furrow wheel is mounted, a steering arm extending from said wheel standard, a bell crank lever pivotally mounted on said steering arm, a steering link pivotally connected between said draft device and the forwardly extending arm of said bell crank lever, said link comprising two sections capable of relative movement for adjusting the effective length of said link, an actuating lever pivotally mounted adjacent to said seat, a latching sector engaged by latch mechanism on said actuating lever for holding the latter in adjusted positions, and an operating rod connected between said actuating lever and the laterally extending arm of said bell crank lever for transmitting adjusting motion to said bell crank lever to change the angle of lead of said front furrow wheel relatively to said draft device, said connecting rod comprising two sections capable of relative movement for adjusting the effective length of said rod.

6. In a wheeled plow having a frame and an operator's seat thereon, front and rear furrow wheels and a land wheel supporting said frame, a draft device pivotally connected to the forward portion of said frame for horizontal swinging movement, a pivoted wheel standard on which said front furrow wheel is mounted, a steering arm extending from said wheel standard, a bell crank lever pivotally mounted on said steering arm, a steering link pivotally connected between said draft device and the forwardly extending arm of said bell crank lever, an actuating lever pivotally mounted adjacent said seat, a latching sector engaged by latch mechanism on said actuating lever for holding the latter in adjusted positions, and an operating rod connected between said actuating lever and the laterally extending arm of said bell crank lever for transmitting adjusting motion to said bell crank lever to change the angle of lead of said front furrow wheel relatively to said draft device.

7. An attachment adapted for detachable mounting upon wheeled plows having an operator's seat, a pivoted draft device capable of vertical and horizontal movement, a dirigible front furrow wheel, and a steering arm and link connection between the wheel and the draft device whereby the wheel is steered, said attachment comprising a bell crank lever adapted to be inserted between said arm and said link with one outwardly extending arm being pivoted at its end with the link, an actuating lever detachably mounted adjacent the operator's seat, and operative connections between said actuating lever and bell crank lever and extending outside of said furrow wheel.

8. The combination of a wheeled plow, comprising a pivoted hitch device capable of horizontal and vertical movement, a front furrow wheel, and a steering arm connected with said furrow wheel, of a bell crank lever having two angularly extending lever arms, one of which arms extends outwardly and beyond said furrow wheel and the other forwardly of the plow, said lever being pivotally mounted at its intermediate portion on said steering arm for horizontal swinging movement, a link adjustable in length and pivoted for horizontal and vertical swinging movement at its ends with said forwardly extending lever arm and with said draft device for operatively connecting said lever arm with said draft device thereby transmitting steering movement from the draft device to the furrow wheel, an actuating lever disposed adjacent to the operator's position on the plow, and another link adjustable in length connected with said outwardly extending lever arm and with said actuating lever and lying outside said furrow wheel, operation of said actuating lever adjusting the angular relation between said furrow wheel and said hitch device.

9. The combination of a wheeled plow, comprising a pivoted hitch device capable of horizontal and vertical movement, a front furrow wheel, and a steering arm connected with said furrow wheel, of a bell crank lever having two angularly extending lever arms, one of which arms extends outwardly and beyond said furrow wheel and the other forwardly of the plow, said lever being pivotally mounted at its intermediate portion on said steering arm for horizontal swinging movement, a link adjustable in length and pivoted for horizontal and vertical swinging movement at its ends with said forwardly extending lever arm and with said draft device for operatively connecting said lever arm with said draft device thereby transmitting steering movement from the draft device to the furrow wheel, an actuating lever disposed adjacent to the operator's position on the plow, and another link adjustable in length connected with said outwardly extending lever arm and with said actuating lever and lying outside said furrow wheel, operation of said actuating lever adjusting the angular relation between said furrow wheel and said hitch device, whereby said bell crank lever can be swung, when the two adjustable links have been disconnected therefrom, without affecting the angular relation between the furrow wheel and the hitch device.

In witness whereof, I hereunto subscribe my name this 2d day of August, 1928.

CARL G. STRANDLUND.